United States Patent
McNeil, Jr. et al.

(10) Patent No.: US 11,487,436 B2
(45) Date of Patent: Nov. 1, 2022

(54) TRIMS CORRESPONDING TO LOGICAL UNIT QUANTITY

(71) Applicant: Micron Technology, Inc., Boise, ID (US)

(72) Inventors: Jeffrey S. McNeil, Jr., Nampa, ID (US); Niccolo' Righetti, Boise, ID (US); Kishore K. Muchherla, Fremont, CA (US); Akira Goda, Boise, ID (US); Todd A. Marquart, Boise, ID (US); Mark A. Helm, Santa Cruz, CA (US); Gil Golov, Backnang (DE); Jeremy Binfet, Boise, ID (US); Carmine Miccoli, Boise, ID (US); Giuseppina Puzzilli, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 122 days.

(21) Appl. No.: 16/995,083

(22) Filed: Aug. 17, 2020

(65) Prior Publication Data
US 2022/0050601 A1 Feb. 17, 2022

(51) Int. Cl.
*G06F 3/06* (2006.01)
*G06F 11/34* (2006.01)
*G06F 11/30* (2006.01)

(52) U.S. Cl.
CPC .......... *G06F 3/0613* (2013.01); *G06F 3/0653* (2013.01); *G06F 3/0659* (2013.01); *G06F 3/0673* (2013.01); *G06F 11/3089* (2013.01); *G06F 11/3409* (2013.01)

(58) Field of Classification Search
CPC .... G06F 3/0613; G06F 3/0653; G06F 3/0659; G06F 3/0673; G06F 11/3089; G06F 11/3409
See application file for complete search history.

(56) References Cited

U.S. PATENT DOCUMENTS

| | | | |
|---|---|---|---|
| 6,691,215 B1 * | 2/2004 | Mirov | G06F 1/3203 713/400 |
| 9,857,995 B1 | 1/2018 | Malina et al. | |
| 2012/0011301 A1 * | 1/2012 | Goss | G11C 16/10 711/E12.001 |
| 2016/0093124 A1 * | 3/2016 | Shi | B64C 39/024 701/2 |
| 2017/0031612 A1 * | 2/2017 | Ravimohan | G06F 3/065 |
| 2019/0043571 A1 * | 2/2019 | Damle | G11C 13/0035 |
| 2019/0065412 A1 * | 2/2019 | Qiu | G06F 3/0635 |
| 2020/0393973 A1 * | 12/2020 | Reusswig | G06F 12/0246 |
| 2021/0004282 A1 * | 1/2021 | Kim | G06F 11/3037 |
| 2021/0383880 A1 * | 12/2021 | Chava | G11C 16/10 |
| 2022/0005527 A1 * | 1/2022 | Nazarian | G11C 13/0061 |

* cited by examiner

*Primary Examiner* — Eric T Oberly
(74) *Attorney, Agent, or Firm* — Brooks, Cameron & Huebsch, PLLC

(57) ABSTRACT

Instructions can be executed to determine a quantity of logical units that are part of a memory device. The instructions can be executed to operate the logical units with a programming time sufficient to provide a required throughput for storage of time based telemetric sensor data received from a host. The instructions can be executed to operate the logical units with a trim that correspond to the programming time.

20 Claims, 5 Drawing Sheets

US 11,487,436 B2

TRIMS CORRESPONDING TO LOGICAL UNIT QUANTITY

TECHNICAL FIELD

Embodiments of the disclosure relate generally to memory systems and more specifically relate to trims corresponding to logical unit quantity.

BACKGROUND

A memory system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
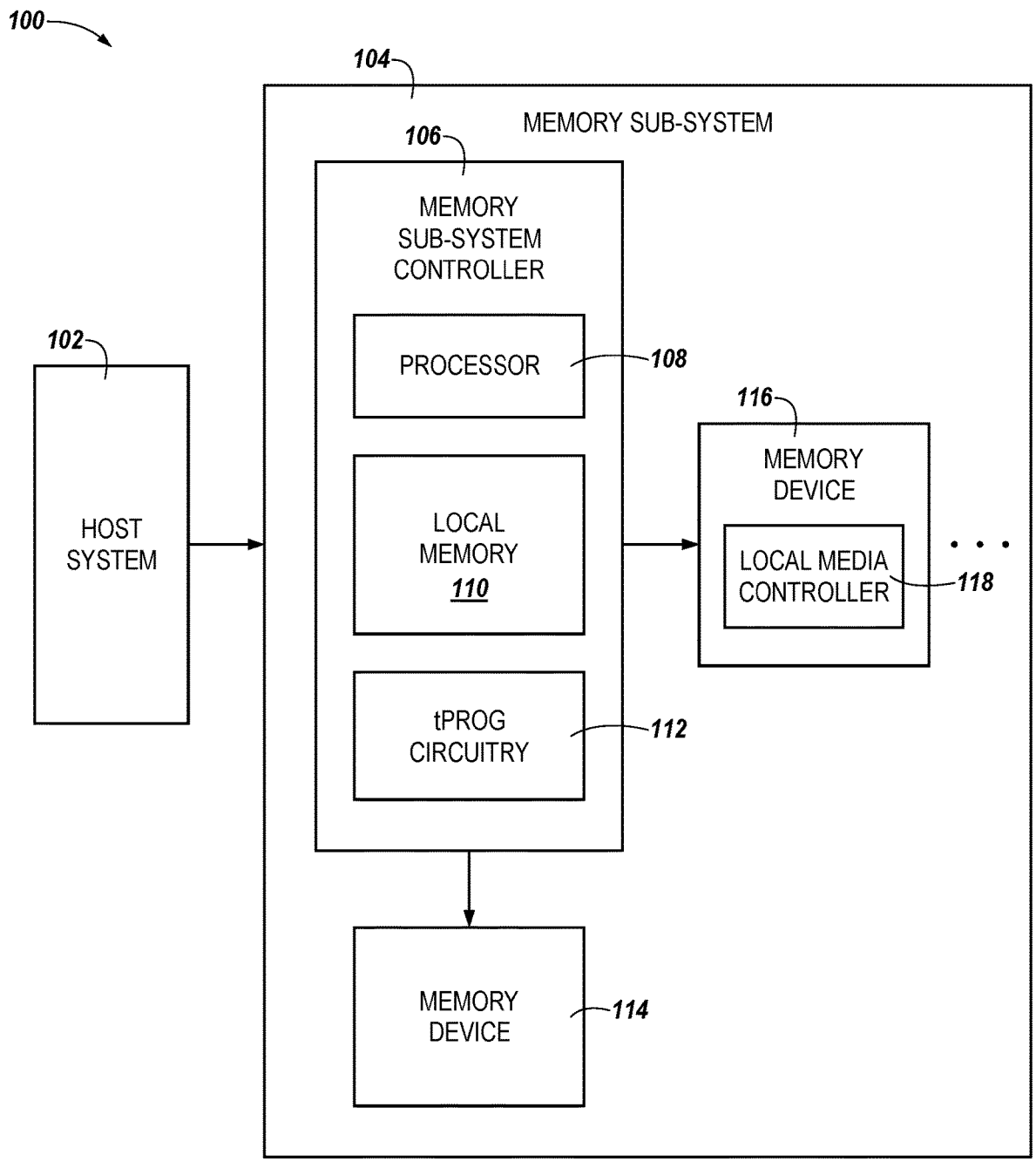
FIG. 1 illustrates an example computing system that includes a memory sub-system in accordance with some embodiments of the present disclosure.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices, such as memory devices that store data. The host system can provide data to be stored at the memory sub-system and can request data to be retrieved from the memory sub-system.

Aspects of the present disclosure are directed to operating a memory device with a relaxed programming time that is sufficient to provide a required throughput for storage of time based telemetric sensor data received from a host and to operating the memory device with a corresponding trim. A vehicle can include a memory sub-system, such as a solid state drive (SSD). The memory sub-system can be used for storage of data by various components of the vehicle, such as applications that are run by a host system of the vehicle. One example of such an application is an event recorder of the vehicle, which may also be referred to as a "black box" or accident data recorder. The event recorder needs to be able to store the host data for later retrieval in response to a trigger event, such as an accident, but it is not necessary that the event recorder store the host data any more quickly than is necessary to keep up with the required throughput.

The emergence of autonomous vehicles, Internet of Things (IoT) and surveillance devices has resulted in a wider gap in between the total bytes written (TBW) in a useable lifetime of a memory sub-system and a user capacity of the memory sub-system. For example, the TBW to user capacity ratio for some memory systems used for such applications has increased by one to three orders of magnitude. Some autonomous vehicles require real time buffering of telemetric data such as video cameras, radar, lidar, ultra-sonic and other sensors that are necessary to playback the sequences preceding an accident. The data from various sensors sums up to a substantial throughput requirement per unit time (e.g., 1 gigabyte per second (GB/sec) sequential write throughput from a host). Upon a trigger event, a quantity of data corresponding to a predetermined playback time immediately preceding the event needs to be captured (e.g., to determine the cause of an accident). The recorded telemetric sensor data corresponding to the predetermined playback time can be referred to as a "snapshot". An event recorder is one such application in where the user capacity requirement could be as low as one hundred and twenty-eight (128) GB, but the TBW requirement could be as high as hundreds of Peta Bytes. The examples of values given are not limiting but highlight the relative difference between the requirements for capacity and TBW. An event recorder may need to store at least a few, most recent snapshots.

Aspects of the present disclosure address the above and other storage challenges for memory sub-systems that are used as event recorders by operating a memory device with a relaxed programming time that is sufficient to provide a required throughput for storage of time based telemetric sensor data received from a host and to operating the memory device with a corresponding trim. A relaxed programming time can improve memory cell endurance versus writing data as quickly as the device is capable. For example, a faster programming time can provide better programming speed, but can yield relatively poor data retention over time. A slower programming time can provide slower programming speed but can yield better data retention over time.

The figures herein follow a numbering convention in which the first digit or digits correspond to the drawing figure number and the remaining digits identify an element or component in the drawing. Similar elements or components between different figures can be identified by the use of similar digits. For example, 102 can reference element "02" in FIG. 1, and a similar element can be referenced as 502 in FIG. 5. Analogous elements within a Figure may be referenced with a hyphen and extra numeral or letter. Such analogous elements may be generally referenced without the hyphen and extra numeral or letter. For example, elements 404-1, 404-2, and 404-R in FIG. 4 may be collectively referenced as 404. As used herein, the designators "B", "N", "P", "R", and "S", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 illustrates an example computing system 100 that includes a memory sub-system 104 in accordance with some embodiments of the present disclosure. The memory sub-system 104 can include media, such as one or more volatile memory devices 114, one or more non-volatile memory devices 116, or a combination thereof. The volatile memory device 114 can be, but is not limited to, random access memory (RAM), such as dynamic random access memory (DRAM), synchronous dynamic random access memory (SDRAM), and resistive DRAM (RDRAM).

A memory sub-system 104 can be a storage device, a memory module, or a hybrid of a storage device and memory module. Examples of a storage device include an SSD, a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a desktop computer, laptop computer, network server, mobile device, a vehicle (e.g., airplane, drone, train, automobile, or other conveyance), IoT enabled device, embedded computer (e.g., one included in a vehicle, industrial equipment, or a networked commercial device), or similar computing system that includes memory and a processing device.

The computing system 100 includes a host system 102 that is coupled to one or more memory sub-systems 104. In some embodiments, the host system 102 is coupled to different types of memory sub-systems 104. FIG. 1 illustrates an example of a host system 102 coupled to one memory sub-system 104. In at least one embodiment, the host system 102 is a computing device that controls a vehicle, such as an autonomous vehicle, and the memory sub-system 104 is an SSD that provides event recorder storage for the vehicle. For example, the memory sub-system 104 can store time based telemetric sensor data for the vehicle. Time based telemetric sensor data is defined in more detail with respect to FIG. 5. Embodiments are not limited to this example. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 102 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, etc.). The host system 102 uses the memory sub-system 104, for example, to write data to the memory sub-system 104 and read data from the memory sub-system 104.

The host system 102 can be coupled to the memory sub-system 104 via a physical host interface. Examples of a physical host interface include, but are not limited to, a serial advanced technology attachment (SATA) interface, a PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 102 and the memory sub-system 104. The host system 102 can further utilize an NVM Express (NVMe) interface to access the non-volatile memory device 116 when the memory sub-system 104 is coupled with the host system 102 by the PCIe interface. The physical host interface can provide an interface for passing control, address, data, and other signals between the memory sub-system 104 and the host system 102. FIG. 1 illustrates a memory sub-system 104 as an example. In general, the host system 102 can access multiple memory sub-systems via a same communication connection, multiple separate communication connections, and/or a combination of communication connections.

The host system 102 can send requests to the memory sub-system 104, for example, to store data in the memory sub-system 104 or to read data from the memory sub-system 104. The data to be written or read, as specified by a host request, is referred to as "host data." A host request can include logical address information. The logical address information can be a logical block address (LBA), which can include or be accompanied by a partition number. The logical address information is the location the host system associates with the host data. The logical address information can be part of metadata for the host data. The LBA can also correspond (e.g., dynamically map) to a physical address, such as a physical block address (PBA), that indicates the physical location where the host data is stored in memory.

An example of non-volatile memory devices 116 include not-and (NAND) type flash memory. NAND type flash memory includes, for example, two-dimensional NAND (2D NAND) and three-dimensional NAND (3D NAND). The non-volatile memory device 116 can be another types of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), and three-dimensional cross-point memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Each of the non-volatile memory device 116 can include one or more arrays of memory cells. One method of operating a memory cell includes storing one-bit per cell, which is referred to as a single level cell (SLC). The "level" refers to the quantity of states to which the cell is programed, other than an erased state (level). An SLC can be programmed to one level other than the erased level. Other methods of operating memory cells include storing more than one bit per cell, such as multi-level cells (MLCs), triple level cells (TLCs), quad-level cells (QLCs), and penta-level cells (PLCs), among others. As used herein, "multi-level cells (MLCs)" refers to a memory cell that is programmable to two levels other than an erased level. In some embodiments, the non-volatile memory device 116 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the non-volatile memory device 116 can be grouped as pages that can refer to a logical portion of the memory device used to store data. With some types of memory (e.g., NAND), pages can be grouped to form blocks.

The memory sub-system controller 106 (or controller 106 for simplicity) can communicate with the non-volatile memory device 116 to perform operations such as reading data, writing data, erasing data, and other such operations at the non-volatile memory device 116. The memory sub-system controller 106 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 106 can be a microcontroller, special purpose logic circuitry (e.g., a field programmable gate array (FPGA), an application specific integrated circuit (ASIC), etc.), or other suitable circuitry.

The memory sub-system controller 106 can include a processing device 108 (e.g., a processor) configured to execute instructions stored in local memory 110. In the illustrated example, the local memory 110 of the memory sub-system controller 106 is an embedded memory configured to store instructions for performing various processes, operations, logic flows, and routines that control operation of the memory sub-system 104, including handling communications between the memory sub-system 104 and the host system 102.

In some embodiments, the local memory 110 can include memory registers storing memory pointers, fetched data, etc. The local memory 110 can also include ROM for storing micro-code, for example. While the example memory sub-system 104 in FIG. 1 has been illustrated as including the memory sub-system controller 106, in another embodiment of the present disclosure, a memory sub-system 104 does not include a memory sub-system controller 106, and can instead rely upon external control (e.g., provided by an external host, or by a processor or controller separate from the memory sub-system 104).

In general, the memory sub-system controller 106 can receive information or operations from the host system 102 and can convert the information or operations into instructions or appropriate information to achieve the desired access to the non-volatile memory device 116 and/or the volatile memory device 114. The memory sub-system controller 106 can be responsible for other operations such as wear leveling operations, error detection and/or correction operations, encryption operations, caching operations, and address translations between a logical address (e.g., logical block address) and a physical address (e.g., physical block address) associated with the non-volatile memory device 116. The memory sub-system controller 106 can further include host interface circuitry to communicate with the host system 102 via the physical host interface. The host interface circuitry can convert a query received from the host system 102 into a command to access the non-volatile memory device 116 and/or the volatile memory device 114 as well as convert responses associated with the non-volatile memory device 116 and/or the volatile memory device 114 into information for the host system 102.

In some embodiments, the non-volatile memory device 116 includes a local media controller 118 that operates in conjunction with memory sub-system controller 106 to execute operations on one or more memory cells of the non-volatile memory device 116. An external controller (e.g., memory sub-system controller 106) can externally manage the non-volatile memory device 116 (e.g., perform media management operations on the memory device 116).

In some embodiments, a memory device 116 is a managed memory device, which is a raw memory device combined with a local controller (e.g., local controller 118) for media management within the same memory device package. An example of a managed memory device is a managed NAND device.

The non-volatile memory device 116 can include a plurality of logical units. The logical units can be numbered and are sometimes referred to in the art as LUNs (logical units numbers). In some embodiments, a logical unit is synonymous with a memory die. Each of the logical units is independently controllable by the memory sub-system controller 106 and/or the local media controller 118. In some embodiments, each of the logical units can be controlled simultaneously for operations such as reading, writing, and erasing, among others. In some embodiments, each logical units is controllable via a separate channel. Some memory sub-systems 104 are overprovisioned with logical units for an intended throughput of the memory sub-system 104. For example, if all of the logical units are being written to in parallel at their fastest available programming time, the memory sub-system can provide its maximum throughput for storage, however, this throughput (e.g., in GB/s) may be greater than the required throughput for storage of data from the host system 102. According to at least one embodiment of the present disclosure, the logical units can be operated with a slowest programming time that allows for a total throughput of the non-volatile memory device 116 to meet the required throughput of the host system 102. For example, the throughput required by the host system 102 can be divided by the quantity of logical units of the non-volatile memory device 116, and then each logical unit can be operated with a programming time to meet that divided required throughput.

The non-volatile memory device 116 can be operated to store both cyclic buffer data and snapshot data. Host data can be received by the memory sub-system 104. The host data can be time based telemetric sensor data from different sensors of a vehicle. The time based telemetric sensor data from the different sensors can be aggregated by the host system 102 and sent to the memory sub-system 104 at a data rate. The host data (e.g., time based telemetric sensor data) can be received by the memory sub-system 104 and buffered (e.g., stored as cyclic buffer data in the non-volatile memory device 116). As an amount of memory reserved for the cyclic buffer data is consumed, new data received from the host system 102 is stored sequentially, but older cyclic buffer data can be erased or overwritten. The portion of the non-volatile memory device 116 storing cyclic buffer data can therefore operate as a first-in-first-out (FIFO) buffer, where newly received data replaced the oldest data therein.

Upon occurrence of a trigger event, an amount cyclic buffer data can be saved as snapshot data. A predefined portion of the buffered time based telemetric sensor data can be saved in response to the trigger event. The amount of host data corresponding to a defined period of time, which may be referred to as a playback time (e.g., 30 seconds), is referred to as a snapshot size and the data itself over that defined period of time is referred to as snapshot data. The snapshot size can be predefined for a period of time immediately preceding a trigger event. The snapshot size and/or playback time can be a predefined value programmed to the memory sub-system 104 by a manufacturer, supplier, or user of the memory sub-system 104.

The memory sub-system controller 106 can also include programming time ("tPROG") circuitry 112. The tPROG circuitry 112 can comprise an ASIC configured to perform the examples described herein. In some embodiments, a local media controller 118 of a non-volatile memory device 116 includes at least a portion of the tPROG circuitry 112. For example, the local media controller 118 can include a processor (e.g., processing device) configured to execute instructions stored on the memory device 114 for performing the operations described herein with respect to the tPROG circuitry 112. In some embodiments, the tPROG circuitry 112 is part of the host system 102, an application, or an operating system.

The tPROG circuitry 112 can be configured to operate a quantity of logical units that comprise the non-volatile memory device 116 with a programming time sufficient to provide a required throughput for storage of time based telemetric sensor data received from the host system 102. The tPROG circuitry 112 can select the programming time from a plurality of programming times that the non-volatile memory device 116 is capable of using. The tPROG circuitry 112 can select a slowest one of the plurality of programming times that is sufficient to provide the required throughput. Some of the plurality of programming times are slower than a fastest programming time of the non-volatile memory device 116.

The tPROG circuitry 112 can determine the quantity of logical units that comprise the non-volatile memory device 116. The tPROG circuitry 112 can determine the quantity of logical units by detecting the quantity of logical units. For example, the tPROG circuitry 112 can query the non-volatile memory device 116 to determine how many logical units it supports. The tPROG circuitry 112 can determine the quantity of logical units by receiving an input defining the quantity of logical units, such as can occur upon an initial connection with the non-volatile memory device 116, for example when the quantity of logical units are specified in a handshake procedure between the tPROG circuitry 112 and the non-volatile memory device 116.

The tPROG circuitry 112 can be configured to determine the required throughput for storage of time based telemetric sensor data received from the host system 102. In at least one embodiment, the tPROG circuitry 112 can determine the required throughput based on input from the host system 102. The memory sub-system controller 106 can receive a definition of the required throughput from the host system 102 via a host interface. The time based telemetric sensor data can also be received via the host interface. In some embodiments, the tPROG circuitry 112 can receive an input (other than from the host system 102) defining the required throughput. Such an input, for example, can be received from a user or received as a parameter from a vendor of the memory sub-system 104 (e.g., based on a priori knowledge of an intended throughput of a host system 102 with which the memory sub-system 104 is intended to work). The tPROG circuitry 112 can divide the required throughput by the quantity of logical units of the non-volatile memory device 116 and then select a programming time (e.g., a slowest programming time) for the logical units that is sufficient to meet the divided required throughput and operate the logical units accordingly.

The tPROG circuitry 112 can be configured to operate the quantity of logical units with one of a plurality of trims that correspond to the selected programming time. Each of the trims also correspond to a respective performance target. Each trim that corresponds to a particular programming time corresponds to a different performance target. Once a programming time has been selected, such as the slowest programming time that is sufficient to meet the required throughput, the tPROG circuitry 112 can select a corresponding trim based on a desired one of the different performance targets. The selected performance target can be a performance target of the non-volatile memory device 116 when the non-volatile memory device 116 is to be operated. Although not specifically illustrated, the plurality of trims can be stored in a library of trims that are stored with correspondence to programming times, such as in a table or database. The tPROG circuitry 112 can select a trim from the library based on the selected programming time.

Trims are sets of operating parameters, such as voltages, which can be used to operate memory cells. The tPROG circuitry 112 can issue or cause to be issued a set trim command, which causes the non-volatile memory device 116 (or portions thereof, such as logical units) to use a particular set of operating parameters to operate the memory cells of the non-volatile memory device 116. Trims can include operating parameters associated with various operations such as program (write), program verify, erase, erase verify, and sense (read), among other operations associated with an array of memory cells.

Trims can be used to achieve or adjust desired threshold voltage (Vt) distributions and/or the voltage spread between different Vt distributions for different data states for memory cells of the non-volatile memory device 116. Different trims can be used for different operations such as programming, reading, and erasing, to achieve different performance targets such as programming speed, reading speed, data retention over time (how long a memory cell reliably stores the data programmed thereto), and memory cell endurance (how reliably a memory cell operates after various quantities of program/erase cycles). The effects of different trims on different performance targets can be known based on testing, historical observation, theoretical modeling, active monitoring of the operation of a memory device, and other methods.

Examples of trims include programming voltages, programming frequency, a program start voltage, a program step voltage, a program inhibit start voltage, and an erase verify voltage. The program start voltage is the magnitude of an initial programming voltage pulse of a series of voltage pulses applied to a selected word line during a programming operation performed on memory cells in a selected block. The program step voltage is the voltage step size between programming voltage pulses. The program inhibit start voltage is a voltage used to inhibit further programming of memory cells once the Vt level associated with a desired data state has been reached. The erase verify voltage is the voltage used to check whether memory cells in the selected block have a Vt level indicative of the erase state.

Other examples of trims include read reference voltages and/or program verify voltages. Program verify voltages represent target voltage levels to which memory cells are to be programmed in order to represent a particular data state. Read reference voltages are voltage levels that can be located between program Vt distributions and used to determine a particular data state of a data cell during a data read operation. As used herein, trims are distinguished from programming times.

The memory sub-system 104 can also include additional circuitry or components that are not illustrated. In some embodiments, the memory sub-system 104 can include a cache or buffer (e.g., DRAM) and address circuitry (e.g., a row decoder and a column decoder) that can receive an address from the memory sub-system controller 114 and decode the address to access the volatile memory device 114 and/or the non-volatile memory device 116.

Figure 2:
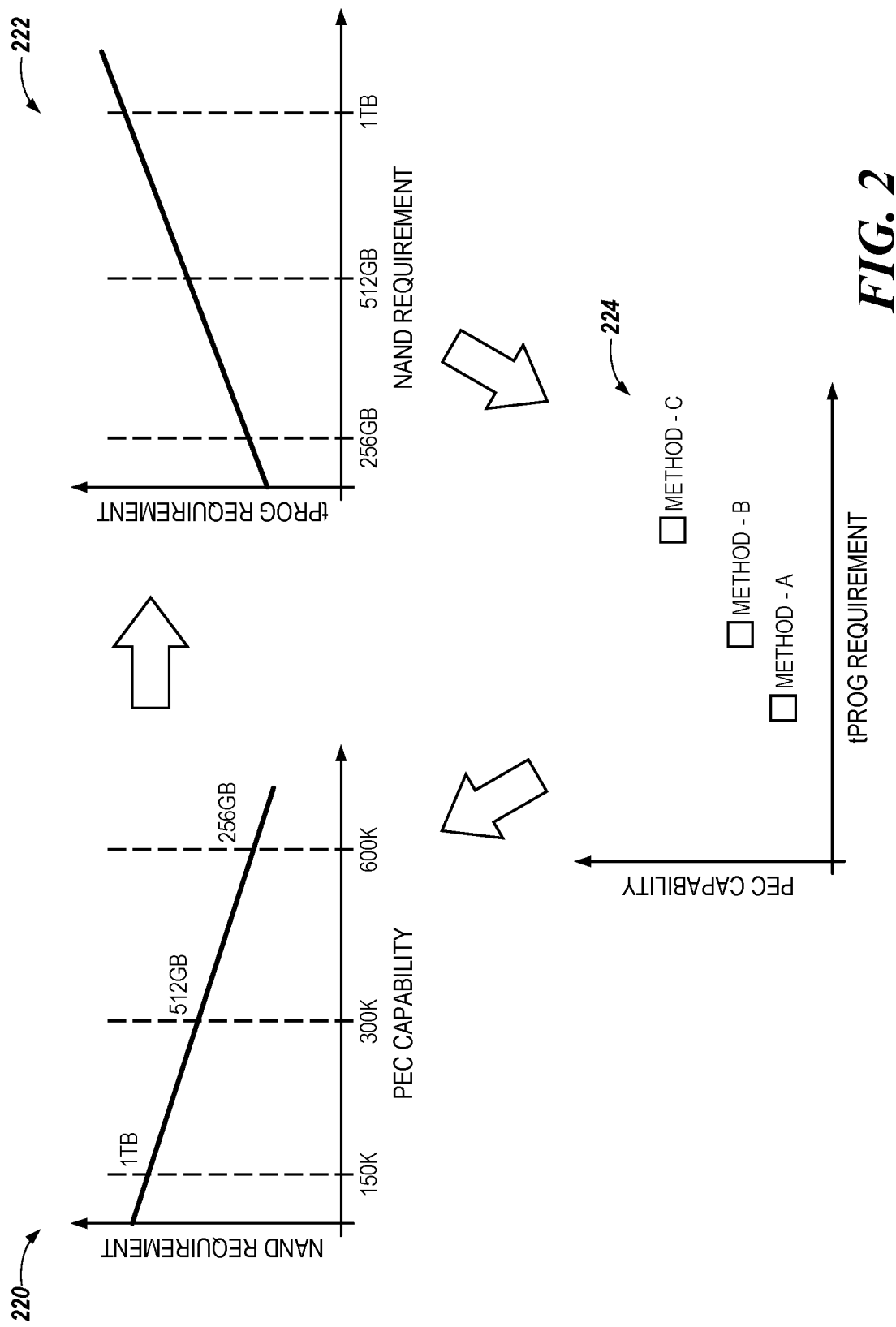
FIG. 2 is a series of plots illustrating a relationship between memory cell endurance and programming time.

FIG. 2 is a series of plots 220, 222, 224 illustrating a relationship between memory cell endurance and programming time. The plot 220 is a graph of an amount of memory required ("NAND REQUIREMENT") versus program/erase cycle capability ("PEC CAPABILITY"). The values shown are non-limiting examples but illustrate that as the PEC capability of the memory increases, the amount of memory required for an application decreases. An example of such an application is a vehicle event recorder. The reduced requirement for memory can save space and cost for the memory sub-system.

The plot 222 is a graph of a programming time requirement ("tPROG REQUIREMENT") versus an amount of memory requirement ("NAND REQUIREMENT"). The values shown are non-limiting examples but illustrate that as the required throughput increases (as indicated by the increased amount of memory required), the programming time necessary to write that amount of memory also increases. An increase in parallelism (writing across multiple channels simultaneously) can allow for a slower programming time while still meeting the required throughput.

The plot 224 is a graph of program/erase cycle capability ("PEC CAPABILITY") versus a programming time requirement ("tPROG REQUIREMENT"). The plot 224 illustrates that a slower programming time allows for increased memory cell endurance. The examples "METHOD-C", "METHOD-B", and "METHOD-A" illustrate different methods of programming a memory device to store time based telemetric sensor data received from a host. Transitioning from method-A to method-B to method-C, slower programming times are used, which results in greater memory cell endurance.

Figure 3:
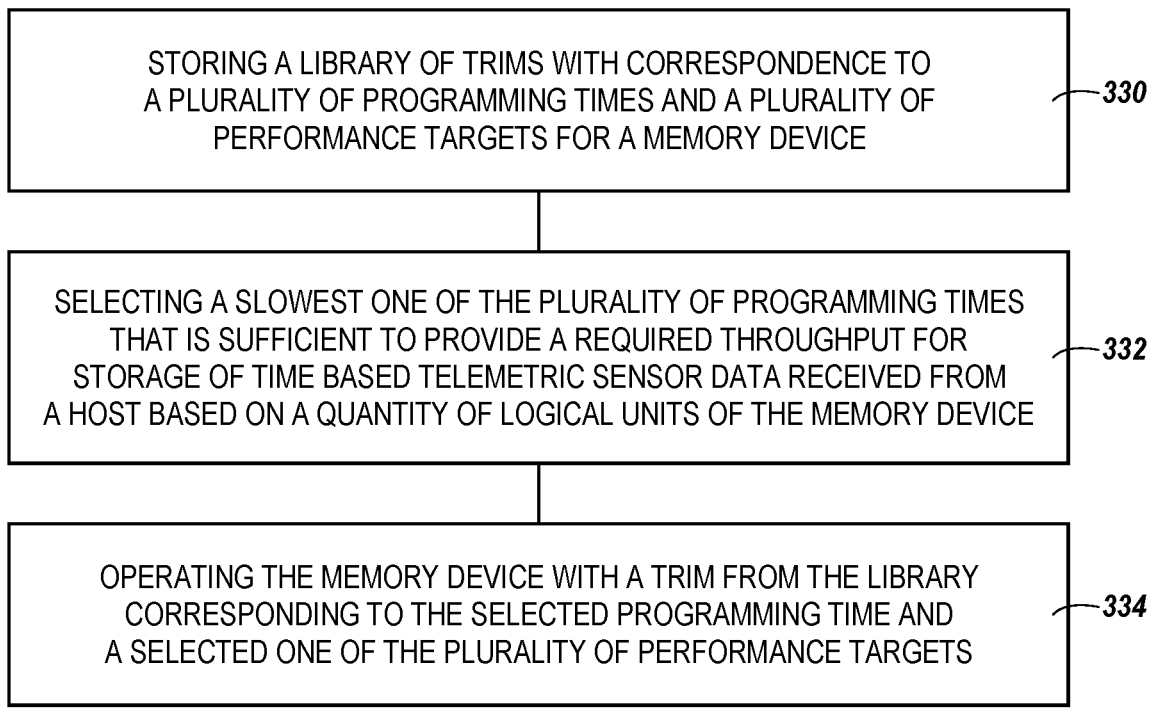
FIG. 3 is a flow diagram of an example method for operating a memory device accordance with some embodiments of the present disclosure.

FIG. 3 is a flow diagram of an example method for operating a memory device accordance with some embodiments of the present disclosure. The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by or using the memory sub-system controller 106, processing device 108, tPROG circuitry 112, non-volatile memory device 116 and/or volatile memory device 114, and/or local media controller 118 shown in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 330 in the example method of FIG. 3, a library of trims can be stored with correspondence to a plurality of programming times and a plurality of performance targets for a memory device, such as the non-volatile memory device 116 illustrated in FIG. 1. At block 332 in the example method of FIG. 3, a slowest one of the plurality of programming times that is sufficient to provide a required throughput for storage of time based telemetric sensor data received from a host can be selected based on a quantity of logical units of the memory device. In some embodiments, a definition of the required throughput can be received from the host upon an initial connection to the host and the memory device can be operated with the selected programming time thereafter. In some embodiments, a definition of the required throughput can be received from the host prior to an initial connection to the host. The quantity of logical units can be detected and the slowest one of the programming times that is sufficient to provide the required throughput can be determined.

At block 334 in the example method of FIG. 3, the memory device can be operated with a trim from the library corresponding to the selected programming time and a selected one of the plurality of performance targets. The memory device can be operated with a first trim for a first period of time and operated with a second trim for a second period of time. The memory device can be operated with the selected programming time during both the first and second periods of time. A first performance target can be selected before operating the memory device with the first trim and a second performance target can be selected before operating the memory device with the second trim.

Figure 4:
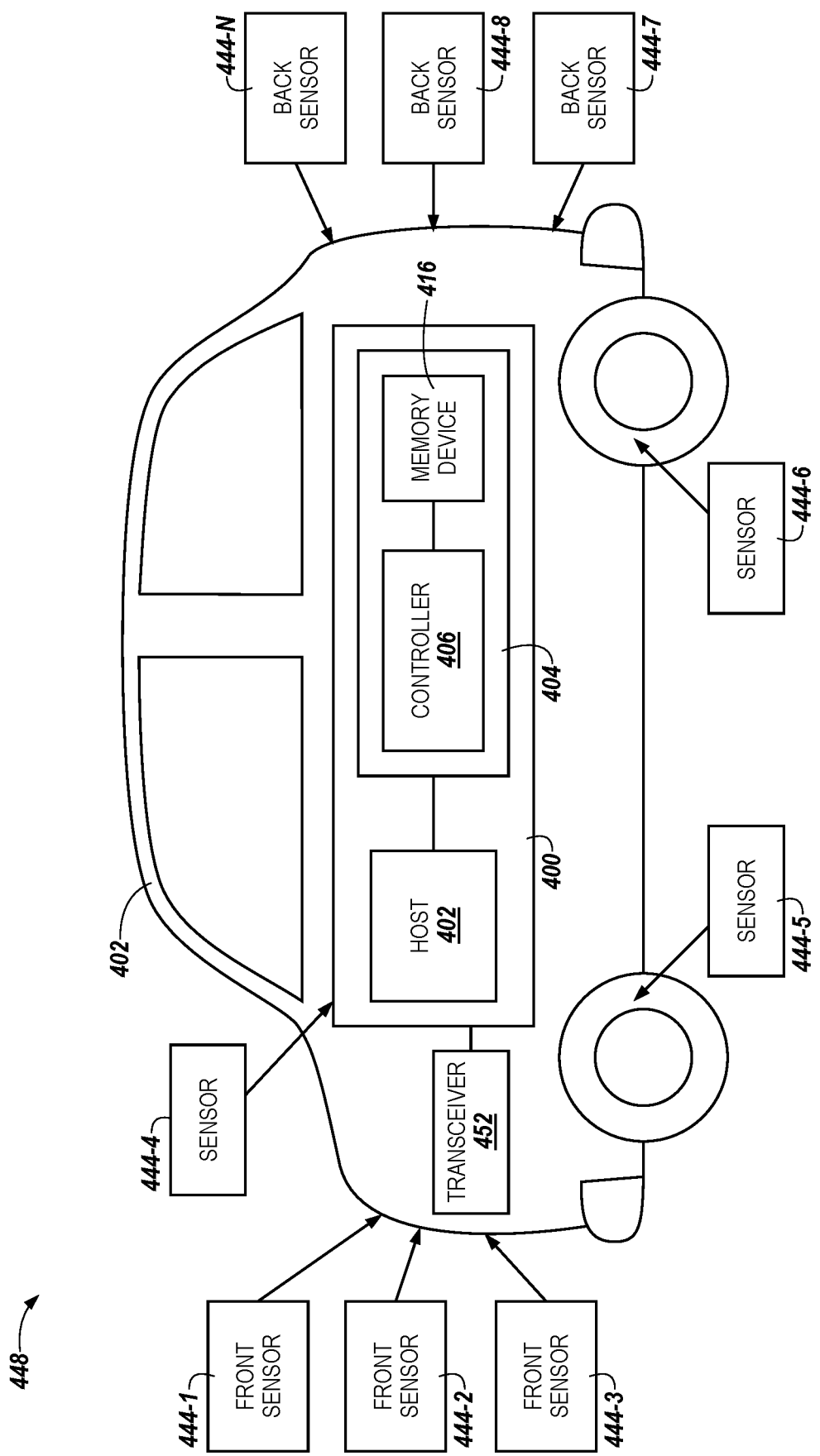
FIG. 4 illustrates an example of a system including a computing system in a vehicle in accordance with some embodiments of the present disclosure.

FIG. 4 illustrates an example of a system 448 including a computing system 400 in a vehicle 450 in accordance with some embodiments of the present disclosure. The computing system 400 can include a memory sub-system 404, which is illustrated as including a controller 406 and non-volatile memory device 416 for simplicity but is analogous to the memory sub-system 104 illustrated in FIG. 1. The computing system 400, and thus the host 402, can be coupled to a number of sensors 444 either directly, as illustrated for the sensor 444-4 or via a transceiver 452 as illustrated for the sensors 444-1, 444-2, 444-3, 444-5, 444-6, 444-7, 444-8, . . . , 444-N. The transceiver 452 is able to receive time based telemetric sensor data from the sensors 444 wirelessly, such as by radio frequency communication. In at least one embodiment, each of the sensors 444 can communicate with the computing system 400 wirelessly via the transceiver 452. In at least one embodiment, each of the sensors 444 is connected directly to the computing system 400 (e.g., via wires or optical cables). As used herein, telemetric sensor data means that the data is collected by sensors 444 that are remote from the memory sub-system 404 that stores the data (the receiving equipment). The telemetric sensor data is time based because the data is correlated with time. The time corresponding to each data point can either be stored with the telemetric data or derivable therefrom based on some metric, such as a known start time for the data and a data rate. The time can be useful in the playback of the sequences preceding an accident, for example.

The vehicle 450 can be a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, a ship, and/or anything used for transporting people and/or goods. The sensors 444 are illustrated in FIG. 4 as including example attributes. For example, sensors 444-1, 444-2, and 444-3 are camera sensors collecting data from the front of the vehicle 450. Sensors 444-4, 444-5, and 444-6 are microphone sensors collecting data from the from the front, middle, and back of the vehicle 450. The sensors 444-7, 444-8, and 444-N are camera sensors collecting data from the back of the vehicle 450. As another example, the sensors 444-4, 444-6 are tire pressure sensors. As another example, the sensor 444-4 is a navigation sensor, such as a global positioning system (GPS) receiver. As another example, the sensor 444-6 is a speedometer. As another example, the sensor 444-4 represents a number of engine sensors such as a temperature sensor, a pressure sensor, a voltmeter, an ammeter, a tachometer, a fuel gauge, etc. As another example, the sensor 444-4 represents a video camera.

In some embodiments, the system 500 can be related to a braking system of the vehicle and can receive time based telemetric sensor data from to the camera sensors 544, the temperature sensors 544, and/or acoustic sensors 544. In some embodiments, the system 500 can be related to a heating/cooling system of the vehicle and can receive time based telemetric sensor data from temperature sensors 544 and/or acoustic sensors 544. In some embodiments, the system 500 can be related to an ambient noise system and can receive time based telemetric sensor data from acoustic sensors 544.

The host 402 can execute instructions to provide an overall control system and/or operating system for the vehicle 450. The host 402 can be a controller designed to assist in automation endeavors of the vehicle 450. For example, the host 402 can be an advanced driver assistance system controller (ADAS). An ADAS can monitor data to prevent accidents and provide warning of potentially unsafe situations. For example, the ADAS can monitor sensors in the vehicle 450 and take control of vehicle 450 operations to avoid accident or injury (e.g., to avoid accidents in the case of an incapacitated user of a vehicle). The host 402 may need to act and make decisions quickly to avoid accidents. The memory sub-system 404 can store reference data in the non-volatile memory device 416 such that time based telemetric sensor data from the sensors 444 can be compared to the reference data by the host 402 in order to make quick decisions.

Figure 5:
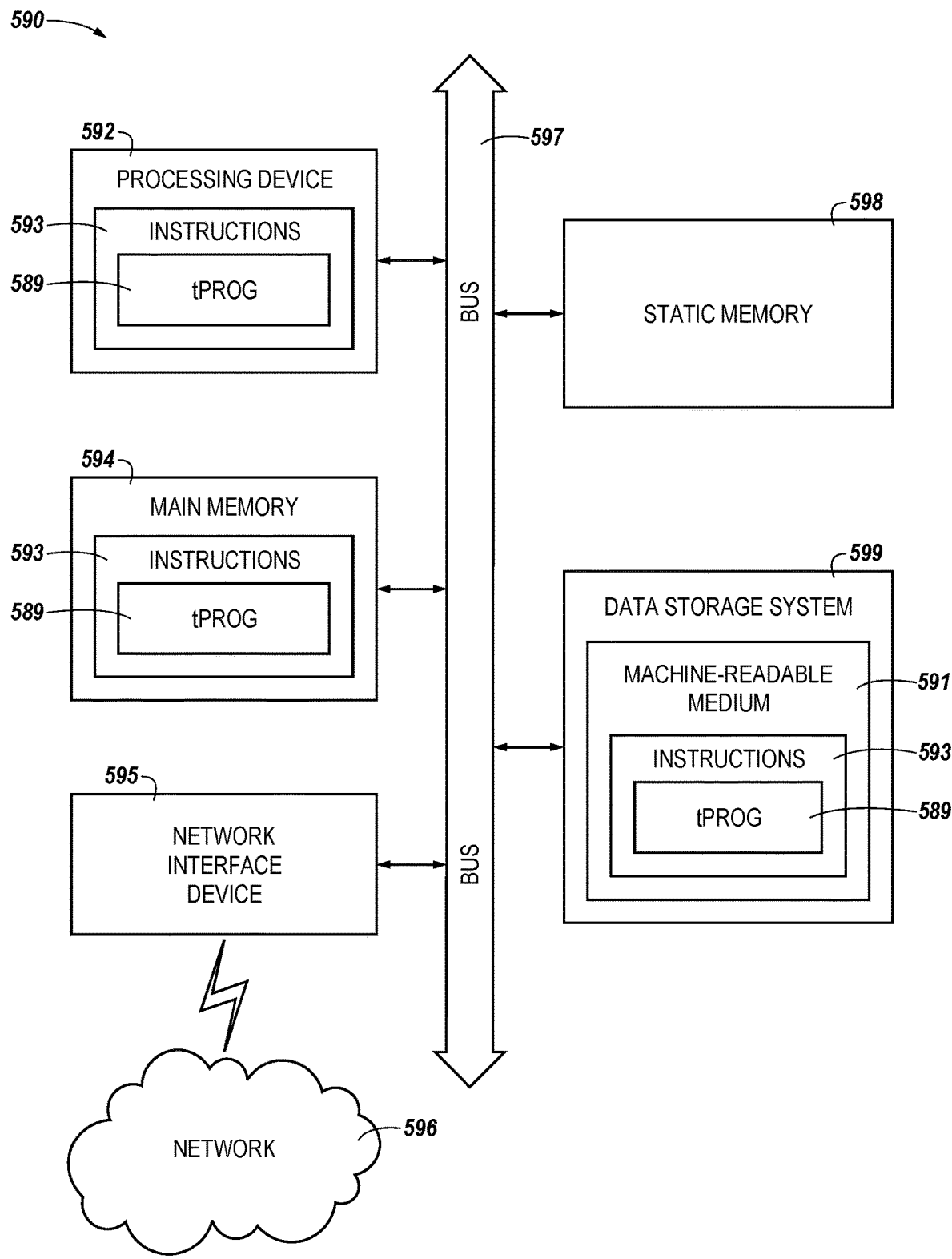
FIG. 5 is a block diagram of an example computer system in which embodiments of the present disclosure can operate.

FIG. 5 is a block diagram of an example computer system 590 in which embodiments of the present disclosure can operate. Within the computer system 590, a set of instructions, for causing a machine to perform one or more of the methodologies discussed herein, can be executed. The computer system 590 includes a processing device 592, a main memory 594, a static memory 598 (e.g., flash memory, static random access memory (SRAM), etc.), and a data storage system 599, which communicate with each other via a bus 597. The data storage system 599 is analogous to the memory sub-system 104 illustrated in FIG. 1.

The processing device 592 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 592 can also be one or more special-purpose processing devices such as an ASIC, an FPGA, a digital signal processor (DSP), network processor, or the like. The processing device 592 is configured to execute instructions 593 for performing the operations and steps discussed herein. The computer system 590 can further include a network interface device 595 to communicate over a network 596.

The data storage system 599 can include a machine-readable storage medium 591 (also known as a computer-readable medium) on which is stored one or more sets of instructions 593 or software embodying one or more of the methodologies or functions described herein. The instructions 593 can also reside, completely or at least partially, within the main memory 594 and/or within the processing device 592 during execution thereof by the computer system 590, the main memory 594 and the processing device 592 also constituting machine-readable storage media.

In one embodiment, the instructions 593 include instructions to implement functionality corresponding to the programming time circuitry 112 of FIG. 1. The instructions 593 can include instructions to determine a quantity of logical units that comprise a memory device. The instructions 593 can include instructions to operate the quantity of logical units with a programming time 589 sufficient to provide a required throughput for storage of time based telemetric sensor data received from a host. The instructions 593 can include instructions to operate the quantity of logical units with one of a plurality of trims that correspond to the programming time.

While the machine-readable storage medium 591 is shown in an example embodiment to be a single medium, the term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, types of disk including floppy disks, optical disks, CD-ROMs, and magnetic-optical disks, ROMs, RAMs, EPROMs, EEPROMs, magnetic or optical cards, or type of media suitable for storing electronic instructions, each coupled to a computer system bus.

The algorithms and displays presented herein are not inherently related to a particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to a particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A non-transitory computer-readable storage medium comprising instructions that, when executed by a processing device, cause the processing device to:
    determine a quantity of logical units that comprise a memory device;
    operate the quantity of logical units with a programming time sufficient to provide a required throughput for storage of time based telemetric sensor data received from a host; and
    operate the quantity of logical units with one of a plurality of trims that correspond to the programming time.

2. The medium of claim 1, further comprising instructions to:
    select the programming time from a plurality of programming times that the memory device is capable of using; and
    select a slowest one of the plurality of programming times that is sufficient to provide the required throughput.

3. The medium of claim 1, wherein each of the plurality of trims that correspond to the programming time also correspond to a different performance target.

4. The medium of claim 3, further comprising instructions to select the one of the plurality of trims based on a desired one of the different performance targets.

5. The medium of claim 1, further comprising instructions to select the one of the plurality of trims from a library of trims stored with correspondence to programming times.

6. The medium of claim 1, further comprising instructions to determine the required throughput based on input from the host.

7. The medium of claim 1, further comprising instructions to receive an input defining the required throughput.

8. The medium of claim 1, wherein the instructions to determine the quantity of logical units comprise instructions to detect the quantity of logical units.

9. The medium of claim 1, wherein the instructions to determine the quantity of logical units comprise instructions to receive an input defining the quantity of logical units.

10. The medium of claim 1, wherein the programming time comprises a programming time slower than a fastest programming time of the memory device.

11. The medium of claim 1, further comprising instructions to:
    buffer the time based telemetric sensor data received from a host; and
    save a predefined portion of the time based telemetric sensor data in response to a trigger event.

12. A method, comprising:
    storing a library of trims with correspondence to a plurality of programming times and a plurality of performance targets for a memory device;
    selecting a slowest one of the plurality of programming times that is sufficient to provide a required throughput for storage of time based telemetric sensor data received from a host based on a quantity of logical units of the memory device; and
    operating the memory device with a trim from the library corresponding to the selected programming time and a selected one of the plurality of performance targets.

13. The method of claim 12, further comprising receiving a definition of the required throughput from the host upon an initial connection to the host; and
    operating the memory device with the selected programming time thereafter.

14. The method of claim 12, further comprising receiving a definition of the required throughput from the host prior to an initial connection to the host.

15. The method of claim 12, further comprising detecting the quantity of logical units; and
    determining the slowest one of the plurality of programming times that is sufficient to provide the required throughput.

16. The method of claim 12, further comprising:
    operating the memory device with a first trim from the library corresponding to the selected programming time for a first period of time;
    operating the memory device with a second trim from the library corresponding to the selected programming time for a second period of time; and
    operating the memory device with the selected programming time during the first and second periods of time.

17. The method of claim 16, further comprising:
    selecting a first of the plurality of performance targets before operating the memory device with the first trim; and
    selecting a second of the plurality of performance targets before operating the memory device with the second trim.

18. A system comprising:
    a processing device; and
    a memory device coupled to the processing device, the memory device comprising a quantity of logical units;
    wherein the processing device is to:
        detect the quantity of logical units;
        receive a definition of a required throughput for storage of time based telemetric sensor data;
        select a slowest one of a plurality of programming times available for the memory device that is sufficient to provide the required throughput; and
        operate the memory device with the selected programming time and a corresponding trim.

19. The system of claim 18, further comprising a host interface from which the processing device is to receive the definition and the time based telemetric sensor data.

20. The system of claim 18, wherein the processing device is further to select the corresponding trim from a library of trims stored with correspondence to programming times based on a performance target of the memory device when the memory device is to be operated.

* * * * *